United States Patent

[11] 3,582,554

[72] Inventor Alfred S. Le Blang
Elnora, N.Y.

[21] Appl. No. 792,570
[22] Filed Jan. 21, 1969
[45] Patented June 1, 1971
[73] Assignee General Electric Company

[54] PORTABLE TELEPHONE COMPUTER TERMINAL
3 Claims, 4 Drawing Figs.

[52] U.S. Cl. .......... 179/2DP, 179/84VF
[51] Int. Cl. .......... H04m 11/06
[50] Field of Search .......... 179/2 DP, 2 R, 6 R, 2 TV, 2, 81 C, 84 L, 90 K, 81, 84 VF; 340/366, 371, 172.5, 336, 324.1, 154

[56] References Cited

UNITED STATES PATENTS

| | | | |
|---|---|---|---|
| 3,403,225 | 9/1968 | Mislan | 179/2 |
| 3,392,239 | 7/1968 | Johnson | 179/1 |
| 3,381,276 | 4/1968 | James | 340/172.5 |
| 3,047,662 | 7/1962 | Smith | 179/2 |
| 3,505,474 | 4/1970 | Quatse | 179/3 |
| 3,502,812 | 3/1970 | Litofsky | 179/2 |
| 3,493,956 | 2/1970 | Andrews et al. | 340/334 |
| 3,388,375 | 6/1968 | Sloughter | 340/18 |

*Primary Examiner*—Kathleen H. Claffy
*Assistant Examiner*—Tom D'Amico
*Attorneys*—Richard R. Brainard, Marvin Snyder, Paul A. Frank, Frank L. Neuhauser, Oscar B. Waddell and Melvin M. Goldenberg

ABSTRACT: Portable display apparatus including a pickup device coupled electromagnetically or acoustically to a selective tone generating telephone permits local display of the digits transmitted by the telephone user when communicating with a computer, and also permits local display of the digits received from the computer. The tones in the receiver are converted to signals which selectively actuate electronic display elements.

Inventor:
Alfred S. Le Blanc,
by Marvin Snyder
His Attorney.

Inventor:
Alfred S. Le Blanc,
by Marvin Snyder
His Attorney.

PORTABLE TELEPHONE COMPUTER TERMINAL

INTRODUCTION

This invention relates to computer terminals, and more particularly to apparatus which permits a selective tone generating telephone to be used directly as a remote computer terminal for two-way communication with a central computer.

The advent of computer time-sharing has made central computer complexes available simultaneously to large numbers of users situated at any geographical location having access to a telephone line. In order to communicate with the computer, the user is generally provided with teletypewriter apparatus and a modem, such as the Western Electric Data Set which is available from American Telephone and Telegraph Company. By coupling the teletypewriter output to the modem, the user may dial the telephone number of the computer center and then transmit data to the computer and receive data from the computer via his teletypewriter. This permits the user to transmit and receive alphanumeric characters, and is highly convenient when the communicated data comprise alphanumeric characters. However, on many occasions, the data to be communicated comprise only decimal numbers. The cost of employing a full teletypewriter type keyboard with its alphanumeric character communication capability for this simplified message is considerably higher, on a cost per unit time per available character basis, then if the alphabetical characters were also to be communicated.

Occasions on which communication of numbers to and from a central computer is desirable are manifold. For example, such occasions might include making inventory and delivery date checks and placing orders for their customers by salesmen, verifying account numbers or credit card numbers, etc. However, it can be quite inconvenient for people in the field, such as salesmen, to have to travel to a fixed station terminal site in order to obtain access to the central computer. Clearly, a low-cost, highly portable computer terminal would be very advantageous to people in the field.

The present invention concerns apparatus which may be employed to convert any telephone which accomplishes dialing of a desired distant telephone electronically by selectively producing predetermined audiofrequency tones, such as the Touch-Tone telephone available from American Telephone and Telegraph Company, into a computer terminal without requiring direct electrical connection to the telephone. This conversion is accomplished by use of a display panel which enables the computer terminal user to read the numerical characters which he and the computer are transmitting to each other. The panel is coupled either electromagnetically or acoustically to the telephone, and converts the communicated audible tones into visually displayed decimal numerals.

A modem at the computer location, or a Western Electric Data Set, is all that is required for the selective tone generating telephone user to communicate directly with the computer. Accordingly, the computer user may thus gain access to the computer through an ordinary selective tone generating telephone and, after coupling his display device to the telephone, may then proceed to communicate with the computer without need for any additional keyboard.

One object of the invention is to provide portable apparatus which enables a telephone to be operated as a computer terminal.

Another object of the invention is to provide apparatus for displaying graphic characters in response to predetermined audio tones.

Another object is to provide a portable device for displaying digits corresponding to tones transmitted and received by a telephone without any direct electrical connection to the telephone.

Another object is to provide apparatus for storage and display of numerals communicated over a telephone circuit.

Briefly, in accordance with a preferred embodiment of the invention, apparatus for enabling operation of a selective tone generating telephone as a computer terminal comprises a plurality of character display devices, shift register means, and pickup apparatus coupled either acoustically or electromagnetically to the telephone and producing electrical signal analogs of the detected tones. The stages of the shift register means are coupled to the pickup apparatus through converter means which converts the electrical signal analogs of detected tones into digital signals for energizing the stages of the shift register means so as to produce displays of characters on the character display devices corresponding to the characters represented by the respective tones communicated over the telephone circuits.

BRIEF DESCRIPTION OF THE DRAWINGS

The features of the invention believed to be novel are set forth with particularity in the appended claims. The invention itself however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
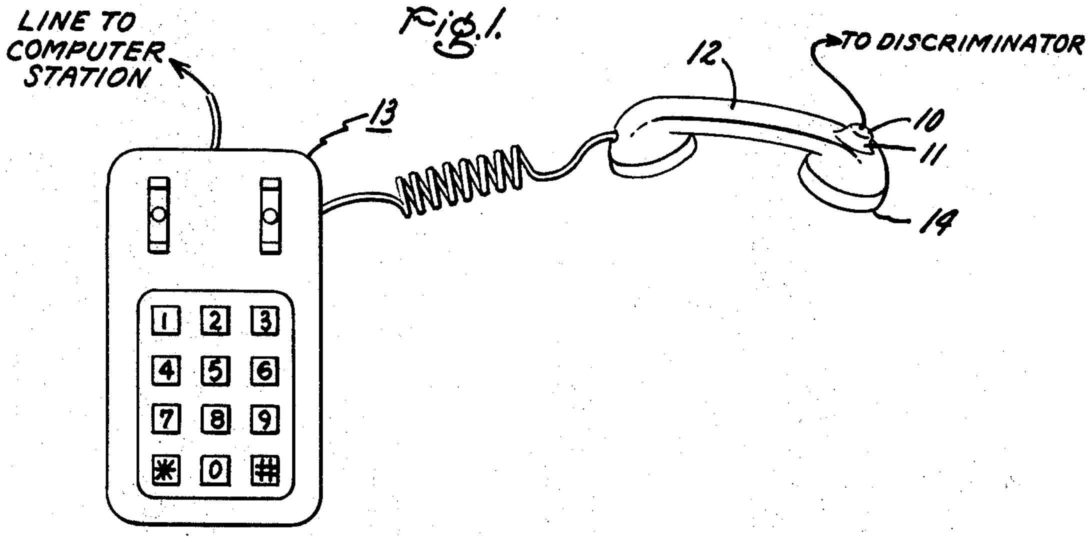
FIG. 1 is an illustration of a pickup device coupled to the handset of a selective tone generating telephone by means of a rubber suction cup.

In FIG. 1, a pickup device 10 is shown coupled to the handset 12 of a selective tone generating telephone 13, such as a Touch-Tone telephone, through nonpermanent fastening means 11, such as a rubber suction cup. This type of fastening is preferable for an acoustic pickup device, since both locally generated tones, or sidetone tones, are produced in the receiver portion of the handset as well as received tones, permitting the pickup device to receive all of the tones in any two-way communication circuit between telephones. In the alternative, the pickup device may comprise an inductive pickup, such as a coil of wire conveniently situated beneath telephone 13, which couples the tones electromagnetically to the display apparatus of the invention.

Figure 2:
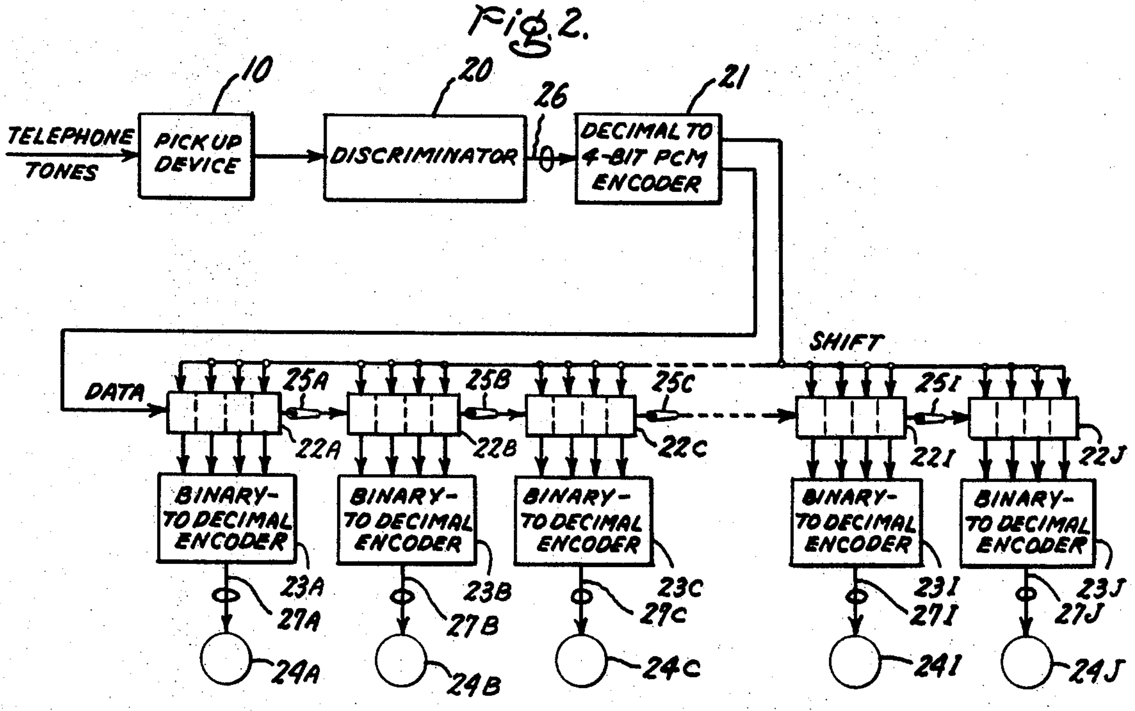
FIG. 2 is a block diagram of apparatus for displaying numerical data communicated in the form of tones over a telephone line, coupled either acoustically or electromagnetically to a telephone connected to the line.

FIG. 2 illustrates apparatus employed to convert tones communicated over telephone circuits into a display of digits. The power requirements of this apparatus are well within the capability of lightweight battery output power capabilities, so that the apparatus is preferably operated from a battery (not shown), conveniently of the rechargeable variety. Pickup device 10 which, as previously pointed out, may comprise an acoustic or inductive pickup, provides electrical signal analogs of the detected tones to a frequency discriminator 20. Discriminator 20 comprises a plurality of selective frequency filters, each of which is tuned to pass but a single frequency corresponding respectively to the frequency of a unique one of the tones communicated over the telephone circuit. Thus, discriminator 20 produces a signal at any one of a plurality of outputs, depending upon frequency of the tone initiating the signal.

Figure 3:
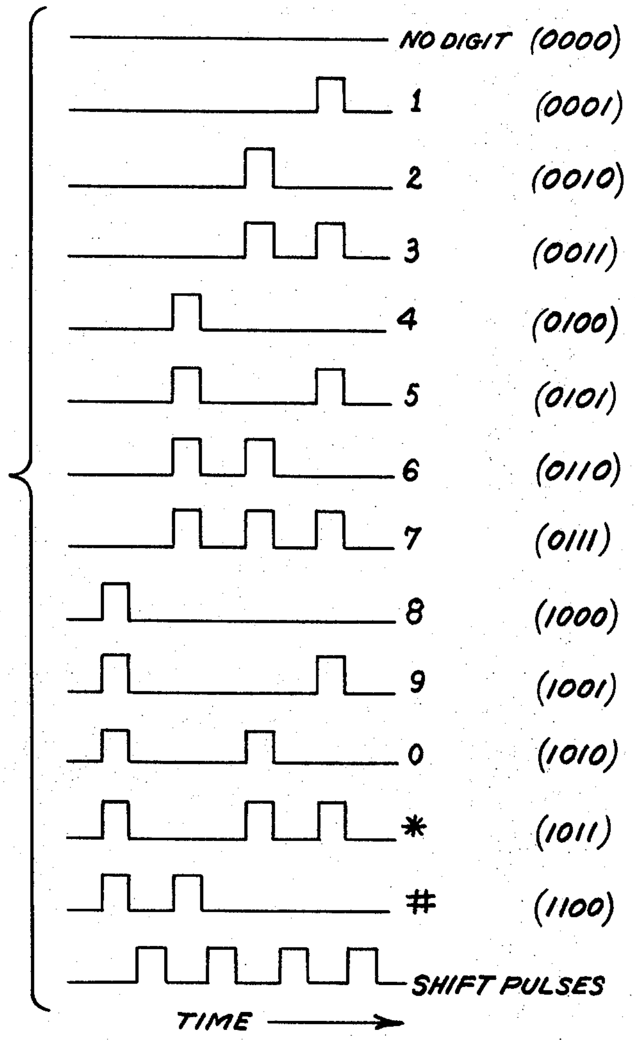
FIG. 3 is an illustration of signals produced by the decimal to 4-bit PCM encoder of FIG. 2.

Each output of discriminator 20 is coupled, respectively, through individual leads in a cable 26 to a decimal to 4-bit PCM encoder 21. A signal on any one of the outputs of discriminator 20 precipitates generation of a train of pulses by encoder 21, each train of pulses being of a unique code depending upon the particular output of discriminator 20 which is energized. Thus, encoder 21 comprises a plurality of pulse generators, each pulse generator producing an output signal which is pulse code modulated (PCM). Each of the PCM signals is unique, and corresponds to a unique tone communicated over the telephone circuit, as detected by pickup device 10. The code employed by encoder 21 is such that presence of a pulse represents a binary ONE and absence of a pulse represents a binary ZERO. In addition, after generation of each binary digit of the code, but prior to generation of the next binary digit of the code, a shift pulse is generated. This shift pulse, which is produced on a separate output lead from encoder 21, is completed prior to initiation of the next binary digit of the code. The output signals of encoder 21 are illustrated in FIG. 3, together with their binary designations and the data represented thereby. In addition, the shift pulses are illustrated in FIG. 3 on a common time axis with the coded data signals produced by encoder 21.

Output signal pulse trains of 4-bit PCM encoder 21 are furnished serially to a first four-stage shift register 22A of a plurality of shift registers 22A—22J, each adjacent pair of which is serially interconnected through switches 25A—25I. The bits generated by encoder 21 are shifted into register 22A until the register has received four bits. The output of the shift register is furnished through a first binary-to-decimal encoder 23A of a plurality of binary-to-decimal encoders 23A—23J and a first cable 27A of a plurality of cables 27A—27J, to a first display device 24A of a plurality of display devices 24A—24J. The energized display device, which is capable of displaying decimal digits from 0 to 9, then displays a digit corresponding to the digit represented by the tone which precipitated the output of a PCM train of pulses from encoder 21. Although, for illustrative purposes, the system illustrated in FIG. 2 is capable of displaying a maximum of 10 digits simultaneously, this number may be increased merely by adding more apparatus to the system.

Each one of display devices 24A—24J may comprise a panel of lamps, such as neon glow lamps, to represent the desired digit. Alternatively, numerical display tubes, such as Nixie tubes available from Burroughs Corporation, Plainfield, N.J., may be employed. In such case, one Nixie tube would be required for each of display devices 24A—24J, respectively. As yet another alternative, electroluminescent displays may be employed.

The next output pulse train furnished to shift register 22A causes the bits previously stored therein to be transferred serially through switch 25A to shift register 22B, so that the symbol formerly displayed by display device 24A is now displayed by display device 24B, and a new symbol is displayed by display device 24A in response to the tone most recently detected by pickup device 10. Thus, the coded representation of a digit previously stored in shift register 22A is now stored in shift register 22B, and the output of shift register 22B controls display device 24B through binary-to-decimal encoder 23B and cable 27B, exactly as in the case of shift register 22A, binary-to-decimal encoder 23A and display device 24A. The next tone detected by pickup device 10 causes shifting of the digits stored in shift registers 22A and 22B into shift registers 22B and 22C, respectively, through switches 25A and 25B, respectively. Similarly, the symbols previously displayed by display devices 24A and 24B are now transferred to display devices 24B and 24C, respectively, since display device 24C is energized through binary-to-decimal encoder 23C and cable 27C from shift register 22C. At the same time, a new symbol is displayed by display device 24A. This serial shifting of data continues until the first digit to have been displayed by the apparatus of FIG. 2 reaches display device 24J by virtue of the coded signal reaching shift register 22J and energizing display device 24J through binary-to-decimal encoder 23J and cable 27J.

The foregoing description assumes that there are 10 digits to be displayed by the apparatus of FIG. 2, so that the first selected digit is displayed by display device 24J, the second selected digit is displayed by display device 24I, and so on, until the final or most recent digit to be displayed, which corresponds to the 10th digit, is displayed by display device 24A. In the event less digits are to be displayed than there are display devices available, the first digit is displayed by the display device coupled to the farthest one of shift registers 22 which that digit reaches by the shifting of coded information through the various shift registers 22. Under these circumstances, any subsequent display devices remain in the dark or no digit condition, while all the other display devices display digits of the number detected by pickup device 10.

Switches 25A—25I are employed to provide capability of blocking out displays of extraneous digits. Thus, in the event numbers of but nine digits, for example, are to be utilized, switch 25I following shift register 22I may be opened. This interrupts the chain of shift registers, making shift register 22I the final shift register of the chain and retaining display device 24J in a dark condition. This obviates any possibility of confusion which might arise due to lingering display of the last digit of the previously displayed number.

In operation, the telephone user calls a central computer location. Once contact with the computer has been made, the user may then proceed to transmit chains of digits to the computer which is programmed to respond thereto. Assuming that each of switches 25A—25I is closed, each chain of digits transmitted by the user is displayed on display devices 24A—24J. Similarly, each chain of numbers received by the user from the computer is also displayed on display devices 24A—24J. In this fashion, the user may communicate back and forth with the computer, with display devices 24A—24J providing a visual record of the communications taking place. Each digit from 0 to 9 may be displayed on display devices 24. However, the symbols * and 0 need not be displayable. This is readily achieved simply by deleting from discriminator 20 those frequency selective filters responsive to the tones represented by the * and 0 pushbuttons on the telephone. Nevertheless, the tones generated by the * and 0 pushbuttons may be employed at the computer to procure a predetermined operating mode of the computer.

As but one example of how credit card verification may be achieved with the instant apparatus, assume that a credit card has been presented to the user of the apparatus, such as a salesman on a trip to one of his company's customers, and the user wishes to verify the validity thereof for a credit transaction involving a specified sum of money. The user couples his apparatus, in the previously described manner, to any convenient telephone, and dials the central time-sharing computer location. Once contact is established with the computer, he presses the pushbuttons on the telephone to correspond with a number which identifies the user and gives him access to data stored in the computer. The number is then displayed on devices 24A—24J so that the user can check to assure himself that he has not made an error in depressing pushbuttons corresponding to the number on the credit card. In the event the telephone user had erred in depressing the pushbuttons, as ascertained by checking the number registered on display devices 24A—24J, he need merely depress the pushbuttons corresponding to the entire correct number. The incorrect number is thereupon shifted out of the display device and the correct number is shifted in. If desired, however, he may interrupt power to the display apparatus momentarily, thereby removing the number from display on devices 24A—24I. After reestablishing power, he may then proceed to depress the pushbuttons corresponding to the correct number.

After the correct number has been displayed, the * pushbutton may be depressed. The * pushbutton furnishes an "execute" signal to the computer. The computer thereupon responds by producing an output signal over the telephone line in the form of sequentially generated tones compatible with the telephone at the user's station. These tones, which are produced by apparatus such as that shown in FIG. 4 and described infra, represent a signal which conveys information to the user, by means of the number thus produced on display devices 24A—24J, that he has properly identified himself and can go ahead, or that he has failed to properly identify himself, in which case he should try again to make correct identification. Once the user has properly identified himself, he then presses pushbuttons on the telephone to correspond with the number printed on this customer's credit card. Again, if the user has erred in depressing the pushbuttons, as ascertained by checking the number registered on display devices 24A—24J, he may correct the number in the manner previously described.

After the correct number has been displayed, the * pushbutton may be depressed, triggering the computer into a search operation to obtain an up-to-date credit rating of the credit card owner. The computer responds by producing an output signal over the telephone line in the form of sequentially generated tones which convey information to the user that either the credit card has been located, is nonexistent, is completely invalid, has been stolen, etc. Each of these signals is represented by a different number displayed by display devices 24A—24J. Assuming that the signal returned by the computer generates a displayed number which the user recognizes as meaning merely that the credit card has been located, the user may then depress pushbuttons corresponding to the sum of money for which the credit card holder seeks credit. Again, the user may verify that the correct sum has been transmitted to the computer by checking the display on devices 24A—24J and, in the event the number is in error, the correct number may be transmitted to the computer by again depressing pushbuttons which now correspond to the correct number, as previously described. Once the user has ascertained that the correct number, representing the sum of money for which he seeks verification has been transmitted to the computer, he then depresses the * pushbutton, permitting the computer to proceed with its evaluation of the credit card owner's financial status. The computer then transmits back to the telephone user a number which may represent either an approval for the sum of money which represents the amount of credit sought by the credit card owner, or a refusal therefor. In the event an approval has been given, the user may then transmit to the computer a number indicating to the computer that the transaction has been consummated and that the credit card owner's account should be debited with the sum of money for which the telephone user is extending credit, followed by an execution command resulting from depressing the * pushbutton. A predetermined number next transmitted by the telephone user, followed by *, causes the computer to transfer the new status of the credit card owner's account back into storage. The telephone user may then hang up the telephone since the transaction has been completed insofar as the computer is concerned. The user may then detach the pickup device from the handset or from beneath the telephone and carry the display apparatus with him to his next stop. Thus, an organization having farflung offices may be extended credit by salesmen traveling to its offices, in a very simple and expeditious manner.

In the preceeding example, only one mode of operation for the apparatus of the invention has been described. Clearly, the apparatus admits of a virtually infinite number of ways to be utilized. It should also be noted that the 0 pushbutton adds the capability of performing specialized operations at the computer location, obviating the need for accomplishing those operations with a numerical code. However, even if the * and 0 pushbuttons should be omitted from the telephone, a numerical code may be employed in place thereof.

Figure 4:
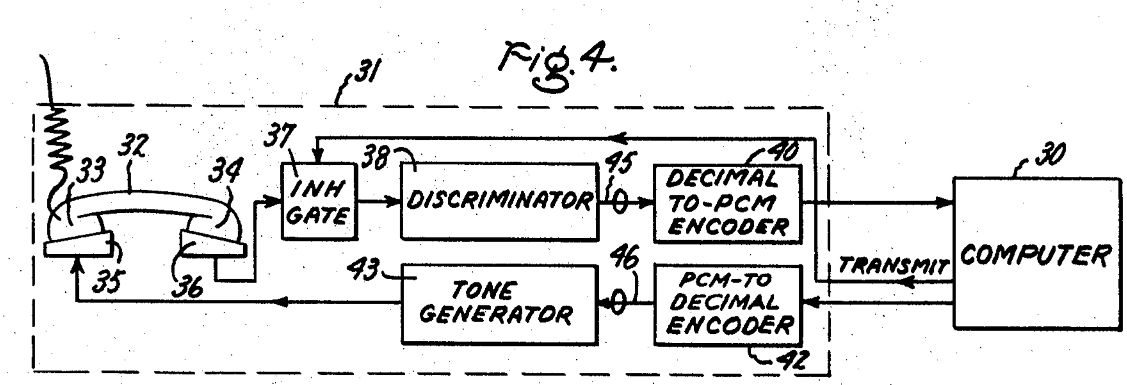
FIG. 4 is a block diagram of a modem situated at a central computer location to permit telephones to communicate directly with the computer by means of selective tone signaling.

FIG. 4 is an illustration of apparatus situated at the location of a central computer 30. Connected to computer 30 are a plurality of modems 31, only one of which is illustrated. Computer 30 being a time-sharing computer, permits a large plurality of modems to be employed simultaneously in conjunction therewith. Each modem comprises the handset 32 of a telephone resting with its mouthpiece portion 33 atop a loudspeaker 35 and its receiver portion 34 resting atop a microphone 36. The output of microphone 36 is coupled through an INHIBIT gate 37 to a frequency discriminator 38 similar to discriminator 20 described in conjunction with the apparatus of FIG. 2. INHIBIT gate 37 is normally in the conductive condition, and is switched to its blocked condition only when the output of computer 30 coupled thereto is actuated into its transmit condition. Output signals from discriminator 38 drive a decimal-to-PCM encoder 40 through a cable 45. Encoder 40 comprises a plurality of pulse code generators, one of which is actuated in response to each discrete signal furnished from discriminator 38. Thus, depending upon the frequency received by discriminator 38 at any particular time, a predetermined train of pulses is generated by encoder 40 corresponding to a coded representation of data to be furnished to computer 30.

Output signals from computer 30 drive a PCM-to-decimal encoder 42 which provides an output signal on predetermined output leads in a cable 46 depending upon the particular code received from computer 30. The individual output signals from encoder 42 actuate a tone generator 43 to produce a predetermined audiofrequency signal. This audiofrequency signal drives loudspeaker 35 to produce tones in the mouthpiece portion of handset 32 which is in communication with a remotely located selective tone generating telephone.

When an output signal is generated by a remotely located, selective tone generating telephone, the tones are received at handset 32 and emitted by the receiver portion thereof. This signal which is picked up by microphone 36 and coupled to computer 30 through gate 37, discriminator 38 and encoder 40, furnishes data to computer 30. The data may comprise either intelligence for the computer to act upon, or an instruction as to how or when the computer is to operate on intelligence previously received or about to be received.

After computer 30 has received, from a remotely located telephone, intelligence, instructions as to how to operate on the intelligence, and a command to execute the instructions, a PCM output signal is furnished to encoder 42 and, at the same time, a signal is furnished to INHIBIT gate 37 thereby interrupting or blocking the circuit from microphone 36 to discriminator 38. This prevents reception of erroneous signals by computer 30 during the time the computer is transmitting; that is, sidetone in handset 32 is rendered ineffective with regard to computer 30. The output signals produced by encoder 42 thereupon actuate tone generator 43 through predetermined leads in cable 46 to cause loudspeaker 35 to emit tones in a predetermined sequence representative of information being furnished to the remote telephone location. In this fashion, therefore, operation of computer 30 is rendered compatible with a selective tone generating telephone at a distant location. In the alternative, modem 31 may comprise a Western Electric Data Set, available from American Telephone and Telegraph Company.

The foregoing describes portable apparatus which enables a telephone to be operated as a computer terminal. The apparatus provides for storage and display of numerals communicated over a telephone circuit by concurrently displaying a plurality of digits corresponding to tones sequentially transmitted and received over the circuit. Yet the apparatus requires no direct electrical connection to the telephone circuit.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

I claim:

1. Apparatus enabling operation of a selective tone generating telephone having input actuators for initiating tone generation as a computer terminal comprising:
   - shaft register means including a plurality of serially interconnected shift register stages;
   - a plurality of character display devices at the location of said tone generating telephone coupled to said shift register means;
   - pickup apparatus coupled to said telephone for detecting tones of predetermined frequencies in said telephone corresponding to operation of predetermined input actuators on said telephone and producing electrical signal analogs of the detected tones; and converter means coupling said shift register means to pickup apparatus and converting said electrical signal analogs of detected tones into digital signals for energizing the stages of said shift register means, said character display devices responding to said shift register means and displaying characters representative of the operation of said input actuators and of said detected tones.

2. The apparatus of claim 1 wherein said pickup apparatus comprises means acoustically coupled to said telephone.

3. The apparatus of claim 1 wherein said pickup apparatus includes means electromagnetically coupled to said telephone.